(12) United States Patent
Teng et al.

(10) Patent No.: US 11,091,565 B2
(45) Date of Patent: Aug. 17, 2021

(54) PREPARATION METHOD OF MODIFIED STARCH ETHER FOR IMPROVING ANTI-SLIDING PROPERTY OF CERAMIC TILE ADHESIVE

(71) Applicant: Shandong Eton New Material Co., Ltd., Shandong (CN)

(72) Inventors: Kun Teng, Shandong (CN); Ming Zhao, Shandong (CN); Qinghua Li, Shandong (CN); Changyin Li, Shandong (CN); Maofeng Li, Shandong (CN); Hongshan Zhao, Shandong (CN); Kaimin Zhang, Shandong (CN)

(73) Assignee: Shandong Eton New Material Co., Ltd., Shandong (CN)

( * ) Notice: Subject to any disclaimer, the term of this patent is extended or adjusted under 35 U.S.C. 154(b) by 0 days.

(21) Appl. No.: 17/032,316

(22) Filed: Sep. 25, 2020

(65) Prior Publication Data
US 2021/0122836 A1    Apr. 29, 2021

(30) Foreign Application Priority Data
Oct. 28, 2019   (CN) .......................... 201911033012.3

(51) Int. Cl.
C08B 31/10 (2006.01)
C09J 11/08 (2006.01)
C09J 103/08 (2006.01)

(52) U.S. Cl.
CPC .............. *C08B 31/10* (2013.01); *C09J 11/08* (2013.01); *C09J 103/08* (2013.01)

(58) Field of Classification Search
CPC .............................. C08B 31/10; C09J 103/08
See application file for complete search history.

(56) References Cited

U.S. PATENT DOCUMENTS 3,734,801 A    5/1973   Sebel
3,890,300 A *  6/1975   Huchette ................ C08B 31/08
                                                        536/111

(Continued)

FOREIGN PATENT DOCUMENTS

| CN | 103509127 A | 1/2014 |
| CN | 107445507 A | 12/2017 |
| CN | 109336537 A | 2/2019 |

OTHER PUBLICATIONS

CNIPA, "First Search Report Issued in Application No. 2019110330123", dated Mar. 24, 2020, p. 2 Published in: CN.

(Continued)

*Primary Examiner* — Liam J Heincer
(74) *Attorney, Agent, or Firm* — Neugeboren O'Dowd PC (57) ABSTRACT

The present disclosure relates to the technical field of building additives, and in particular to a preparation method of modified starch ether for improving the anti-sliding property of a ceramic tile adhesive. The preparation method includes chemical modification of subjecting starch to one-step etherification to obtain starch ether, followed by physical modification. In the preparation method, the cumbersome multi-step etherification in existing methods for preparing modified starch ether is avoided, and only one-step etherification is used to obtain modified starch ether of better properties. Because physical modification is added, the obtained product can significantly improve the anti-sliding property of a ceramic tile adhesive. Moreover, the conditions for one-step etherification are significantly different from the prior art.

10 Claims, 5 Drawing Sheets

(56) References Cited

U.S. PATENT DOCUMENTS

| | | | | |
|---|---|---|---|---|
| 4,017,460 | A | * | 4/1977 | Tessier .................... C08B 31/08 |
| | | | | 536/50 |
| 4,451,649 | A | * | 5/1984 | Teubner ................. C08B 31/12 |
| | | | | 106/206.1 |
| 4,462,838 | A | * | 7/1984 | Andres .................. C09J 103/08 |
| | | | | 106/145.4 |
| 4,487,864 | A | * | 12/1984 | Bermudez ............. C04B 24/383 |
| | | | | 524/2 |
| 2010/0258037 | A1 | * | 10/2010 | Mann ...................... C04B 28/02 |
| | | | | 106/804 |
| 2014/0135429 | A1 | * | 5/2014 | Kiesewetter ........ C04B 20/1022 |
| | | | | 524/5 |
| 2014/0287148 | A1 | * | 9/2014 | Kiesewetter ............ B28B 11/04 |
| | | | | 427/384 |

OTHER PUBLICATIONS

CNIPA, "Second Search Report Issued in Application No. 2019110330123", dated Jun. 16, 2020, p. 2 Published in: CN.

"Adhesives for Ceramic Wall and Floor Tile", 2005, p. 35 Published in: CN.

"Edible Modified Starch", Mar. 31, 2016, pp. 46-50, Published in: CN.

"Organic Food Surfactants", Apr. 30, 2009, p. 2 Published in: CN.

"Starch Production and Its Deep Processing Technology", Jul. 31, 2009, p. 2 Published in: CN.

"Weaving Production Technology", Apr. 30, 2007, p. 4 Published in: CN.

* cited by examiner

PREPARATION METHOD OF MODIFIED STARCH ETHER FOR IMPROVING ANTI-SLIDING PROPERTY OF CERAMIC TILE ADHESIVE

CLAIM OF PRIORITY UNDER 35 U.S.C. § 119

This application claims priority to Chinese Patent Application No. 201911033012.3 filed on Oct. 28, 2019, the entire contents of which are incorporated herein by reference.

TECHNICAL FIELD

The present disclosure relates to the technical field of building additives, and in particular to a preparation method of modified starch ether for improving the anti-sliding property of a ceramic tile adhesive.

BACKGROUND

Ceramic tile, a decorative material, has a broad market. As a higher and higher degree of specialization is achieved in the ceramic tile market, the seamless wall decoration is increasingly required by consumers, making large-size ceramic tiles more popular. The popularity of large-area residential buildings also contributes to the increasing demand for large-size ceramic tiles. Higher safety is required due to larger size and higher quality. Since traditional ceramic tile adhesives can hardly meet the requirements, novel ceramic tile adhesives are booming.

A novel ceramic tile adhesive composition includes cement, sand, heavy calcium carbonate, redispersible latex powder, cellulose ether, lignocellulose and the like. Chinese patent CN107445507A discloses a modified cellulose ether for improving the anti-sliding property of a ceramic tile adhesive. Generally, more branched chains in a polysaccharide molecule means a more complicated net structure formed by the polysaccharide molecule dispersed in water, a more significant bridging effect for cement particles, a greater yield stress imposing on mortar, and thus a better anti-sagging or anti-sliding effect. However, the polysaccharide molecule of cellulose ether usually has a linear structure. With few branched chains, cellulose ether can only provide prominent water retention and thickening properties for a ceramic tile adhesive, but cannot provide an excellent anti-sliding or anti-sagging property to ensure the construction of large-size ceramic tiles and other decorative materials. However, starch ether, made from natural starch with high amylopectin content, can provide an excellent anti-sliding or anti-sagging property for a ceramic tile adhesive. Chinese patent CN109336537A discloses a ceramic tile adhesive and a preparation method thereof. While starch ether is also used in this ceramic tile, the anti-sliding property of this ceramic tile can merely meet the basic requirement for anti-sliding in JC/T547-2005, namely, sliding ≤ 0.5 mm for 200 g ceramic tile. For many large-size ceramic tiles with a mass greater than 200 g, the anti-sliding requirement cannot be met.

Therefore, not all ceramic tile adhesives including starch ether have an excellent anti-sliding property, which also depends on the starch ether product and the use thereof in a ceramic tile adhesive composition.

Starch ether, also called etherified starch, is a general term for a type of modified starch including an ether linkage. Starch ether is a substituted starch ether produced by the reaction of the hydroxyl in a starch molecule with a reactive substance, including hydroxyalkyl starch, carboxymethyl starch, cationic starch, or the like, and is widely used in building, medicine, food, textile, papermaking, daily chemicals, petroleum, and other industries. Starch ether, used as an additive for a cement-based product, a gypsum-based product and a limestone product in the building field, has a prominent compatibility with other building additives, and is especially suitable for dry blends in building, such as mortar, adhesive, plaster, and a material applied by rolling.

Industrially, methods for preparing starch ether mainly include wet-type and dry-type. The wet method, also known as a slurry method, includes dispersing starch in water or other liquid medium to obtain a suspension with a certain concentration (starch milk). At a certain temperature, the starch milk is etherified by chemical reagents to produce modified starch. If the dispersion medium used is not water, but an organic solvent or a mixed solvent including water, this method is also called a solvent method for the sake of distinction. Most modified starches can be produced by the wet method. In the dry method, starch reacts with chemical reagents to produce modified starch, with a small amount of water (usually about 30%) or a small amount of organic solvent. The small amount of water in the dry reaction system brings great challenge to the thorough mixing of starch with chemical reagents. Industrially, in addition to mixing by a special mixing equipment, mixing at a wet state and reacting at a dry state are also adopted to produce the modified starch by two steps. More types of starch ether are produced by the wet method than by the dry method, but the dry method is a promising method due to its simple process, high yield, and non-pollution.

However, the dry methods for preparing a starch ether product mostly include multi-step etherification. These methods are cumbersome and not conducive to industrial production, and generally only involve chemical modification. As the requirements on ceramic tile adhesives increase, it is the trend of research in this industry to produce modified starch ether by a special modification method to achieve the higher anti-sliding or anti-sagging property of a ceramic tile adhesive required by large-size, heavy ceramic tiles without compromising the binding property of the ceramic tile adhesive and increasing the cost.

SUMMARY

In order to overcome the shortcomings of the prior art, the present disclosure provides a preparation method of modified starch ether for improving the anti-sliding property of a ceramic tile adhesive. In this preparation method, the cumbersome multi-step etherification in an existing method for preparing modified starch ether is avoided, and only one-step etherification is needed by controlling special operating conditions, and physical modification is added to obtain a product of better properties. Moreover, the conditions for one-step etherification in this method are significantly different from the prior art. Etherification can be initially conducted at a lower temperature without affecting the etherification efficiency of an etherifying agent and the production cost. The problems existing in the prior art are effectively solved.

In some embodiments, the following technical solutions can be used.

In some embodiments, the present disclosure provides a preparation method of modified starch ether for improving the anti-sliding property of a ceramic tile adhesive, including chemical modification of subjecting starch to one-step etherification to obtain starch ether, followed by physical modification.

The chemical modification of one-step etherification can include the following steps: starch, alkalizer, alcohol and inhibitor are mixed; etherifying agents are added; and etherification can be conducted at a lowered temperature for a certain period of time, and then can be conducted in stages at different raised temperatures.

There are many types of etherifying agents.

Before the step of adding the etherifying agents, a step of charging the reactor with nitrogen to remove oxygen can be included.

In the above steps, after the etherifying agents are added, etherification can be first conducted at a lowered temperature of 10° C. to 20° C. for 1.5 h to 2.5 h. It is intended to ensure that the materials react in a uniform manner and are fully dispersed to improve the etherification efficiency of a single etherifying agent and the reaction safety.

The starch can be one or more of corn starch, tapioca starch, potato starch, and wheat starch, preferably one or more of corn starch, tapioca starch, and potato starch, more preferably one or two of tapioca starch and potato starch, and further more preferably tapioca starch; the alkalizer can be alkali metal hydroxide powder, preferably NaOH and/or KOH, and more preferably NaOH; the alcohol can be one or more of methanol, ethanol, isopropanol, n-butanol, tert-butanol, acetone, and diethylene glycol, preferably ethanol and/or isopropanol, and more preferably ethanol; the inhibitor can be an alkali metal salt, preferably $Na_2SO_4$ and/or NaCl, and more preferably $Na_2SO_4$; and the etherifying agent can be one or more of chloroacetic acid or sodium chloroacetate, methyl chloride, ethyl chloride, propylene oxide, and ethylene oxide, and preferably one or more of chloroacetic acid, propylene oxide, and ethylene oxide.

The one-step etherification can be conducted at 10° C. to 90° C., and preferably at 20° C. to 60° C., for 2 h to 20 h. The starch, the alkalizer and the etherifying agent can be used in etherification at a mass ratio of 1:(0.01-1.5):(0.02-1.75), and preferably, at a mass ratio of 1:(0.01-1):(0.02-1.2); the starch and the inhibitor can be used in etherification at a mass ratio of 1:(0.05-0.1); and the starch and the alcohol can be used in etherification at a mass ratio of 1:(0.1-2), and preferably, at a mass ratio of 1:(0.2-1).

At the end of the etherification at a reduced temperature, etherification can be further conducted in stages, for example, at 40° C. for 2.5 h to 3 h and at 60° C. for 4 h to 5 h.

The physical modification can be conducted by mixing the starch ether, thickener and rheological agent for 40 min to 60 min.

The starch ether, thickener, and rheological agent, in percentage by weight, can be 5% to 40%, 50% to 94%, and 1% to 10% respectively, preferably, 10% to 30%, 62% to 88%, and 2% to 8% respectively, and more preferably, 20% to 30%, 64% to 76%, and 4% to 6% respectively.

The thickener can be one or more of carboxymethyl cellulose, methyl cellulose, hydroxypropyl methyl cellulose, hydroxyethyl methyl cellulose and hydroxyethyl cellulose, and preferably one or two of hydroxypropyl methyl cellulose and hydroxyethyl methyl cellulose. The rheological agent can be one or more of guar gum, carrageenan and xanthan gum.

The starch ether can be one or more of monosubstituted starch ether (with one substituent, such as carboxymethyl starch, hydroxypropyl starch, and hydroxyethyl starch), disubstituted starch ether (with two substituents, such as carboxymethyl hydroxypropyl starch, hydroxypropyl hydroxyethyl starch, and carboxymethyl hydroxyethyl starch), and trisubstituted starch ether (with three substituents, such as carboxymethyl hydroxypropyl hydroxyethyl starch, hydroxypropyl hydroxyethyl ethyl starch, and hydroxypropyl hydroxyethyl methyl starch), and preferably one or two of disubstituted starch ether and trisubstituted starch ether.

The present disclosure further provides a modified starch ether prepared by the above preparation method.

The present disclosure provides use of the modified starch ether in the preparation of a ceramic tile adhesive.

The modified starch ether can weigh 0.2% to 0.5%, and preferably 0.3% to 0.5%, of the ceramic tile adhesive.

The beneficial effects of the embodiments disclosed herein are as follows:

The modified starch ether prepared by the preparation method provided in the present disclosure can be used in a ceramic tile adhesive, resulting in a significant improvement in the anti-sliding property of the ceramic tile adhesive compared to the prior art. In the preparation method of the present disclosure, raw starch can be subjected to one-step etherification with various etherifying agents to produce starch ether with various branched structures, and then a specific amount of thickener and rheological agent can be added for physical modification to obtain modified starch ether with more complicated branched structures. The modified starch ether dispersed in water can form a complicated net structure without compromising the binding property of a ceramic tile adhesive, thereby leading to a significant bridging effect for cement particles, a greater yield stress imposing on mortar, and thus a better anti-sagging or anti-sliding effect.

The preparation process of the present disclosure from raw starch to modified starch ether can avoid the use of water. The water in the raw starch can be used as a solvent for alkalizer, and a minimum amount of alcohol can be used as a dispersant for alkalizer, thereby avoiding the use of a large amount of alcohol and water in the preparation of modified starch ether by a traditional method. The alcohol and etherifying agent are recovered for reuse during the drying process after reaction. Since the product does not need to be washed and neutralized, the process of preparing modified starch ether is greatly simplified compared to a traditional method. With simple process and equipment, easy operation and no three wastes, this method is environmentally friendly. The obtained modified starch ether has a stable quality and a function of improving the anti-sliding property of a ceramic tile adhesive, and can be applied to the large-size, heavy ceramic tiles. Safety in the usage of ceramic tiles is improved to meet demands from consumers.

The preparation method of the present disclosure is significantly different from the existing modification methods in terms of operating conditions. Especially, the etherification is usually conducted at a temperature above 35° C. in the chemical modification of an existing method, because a temperature below 35° C. will cause problems, such as lower etherification efficiency, higher cost, and longer reaction time. In the method of the present disclosure, etherification can be initially conducted at a lowered temperature for a certain period of time, and then conducted in stages at different raised temperatures. The etherification at a lowered temperature can ensure the sufficient dispersion of materials, and also increase the etherification efficiency of a single etherifying agent and the reaction safety. This modification process ensures a smooth and efficient preparation process, with simplified operations, fewer resources, and less energy.

DETAILED DESCRIPTION

In order to clearly explain the technical features of the solution, the present disclosure will be described in detail below through specific implementations with reference to accompanying drawings.

The content of amylose, amylopectin and total starch in the raw starch used in each example is determined by the dual-wavelength colorimetry.

1) Preparation of Reagents

Iodine reagent: 2.000 (±0.005) g of potassium iodide is weighed and dissolved in an appropriate amount of distilled water to obtain a saturated solution, and then 0.200 (±0.001) g of iodine is added. After iodine is completely dissolved, the solution is transferred to a 100 mL volumetric flask and precisely diluted to 100 mL with distilled water. This reagent is prepared just before use and stored in the dark.

Amylose standard solution: 0.1000 g of amylose standards is weighed and added to a 50 mL beaker, and a few drops of anhydrous ethanol are added to wet amylose. Then 10 mL of 0.5 mol/L KOH solution is added. After amylose is completely dissolved at 80 (±1)° C. under a water bath, the resulting solution is precisely diluted to 100 mL with distilled water. A 1 mg/mL amylose standard solution is obtained. 1 mL of 1 mg/mL amylose standard solution is added to a 50 mL volumetric flask, and 30 mL of distilled water is added. The pH of the solution is adjusted to 3.0 with a 0.1 mol/L HCL solution, and then 0.5 mL of iodine reagent is added. The resulting solution is precisely diluted to 50 mL with distilled water, and then stands for 20 min With distilled water including 0.1 mol/L HCL and iodine reagent as blank, ultraviolet-visible spectroscopy is performed on the amylose standard solution at a wavelength range of 400 nm to 900 nm to obtain an absorption curve for amylose. 0 mL, 0.3 mL, 0.6 mL, 0.9 mL, 1.2 mL, 1.5 mL and 1.8 mL of 1 mg/mL amylose standard solution are respectively added to 50 mL volumetric flasks, and 20 mL to 30 mL of distilled water is added to each flask. The pH of each solution is adjusted to 3.0 with 0.1 mol/L HCL, and then 0.5 mL of iodine reagent is added. The resulting solutions are precisely diluted to 50 mL and thoroughly mixed to obtain a series of standard solutions at concentrations of 0 μg/mL, 6 μg/mL, 12 μg/mL, 18 μg/mL, 24 μg/mL, 30 μg/mL and 36 μg/mL.

Amylopectin standard solution: 0.1000 g of amylopectin standards is weighed, and then a 1 mg/mL amylopectin standard solution is prepared according to the preparation method of amylose standard solution. 3 mL of 1 mg/mL amylopectin standard solution is added to a 50 mL volumetric flask, and the subsequent operations are the same as that for amylose. An absorption curve within the visible spectrum is obtained in the same coordinate system for amylopectin. 0 mL, 2.0 mL, 2.5 mL, 3.0 mL, 3.5 mL, 4.0 mL, 4.5 mL and 5.0 mL of 1 mg/mL amylopectin standard solution are used to prepare a series of amylopectin standard solutions at concentrations of 0 μg/mL, 40 μg/mL, 50 μg/mL, 60 μg/mL, 70 μg/mL, 80 μg/mL, 90 μg/mL and 100 μg/mL.

Figure 1:
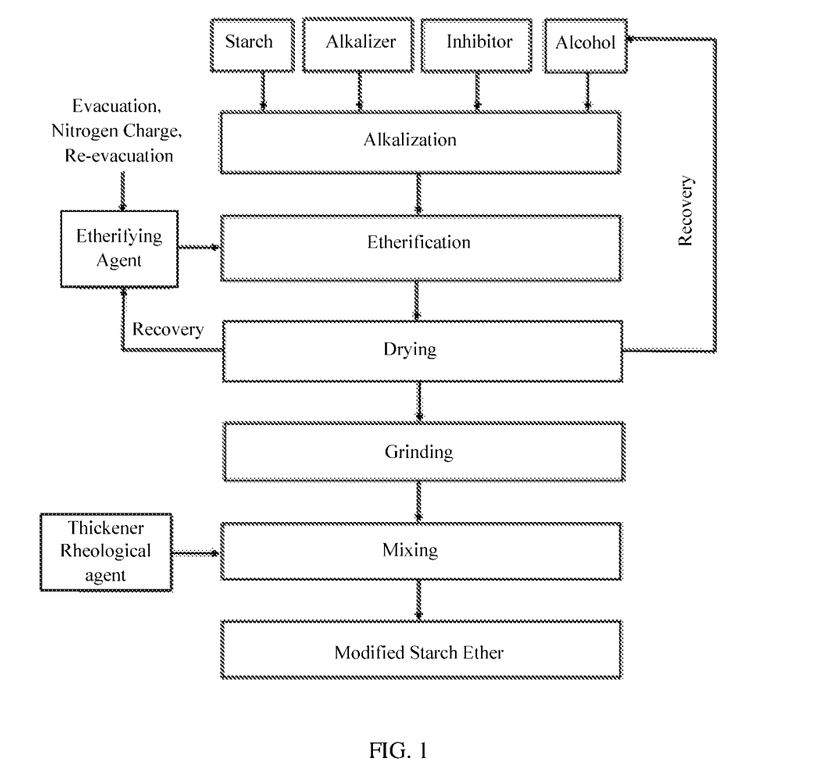
FIG. 1 is a flowchart of a process according to the present disclosure.
Figure 2:
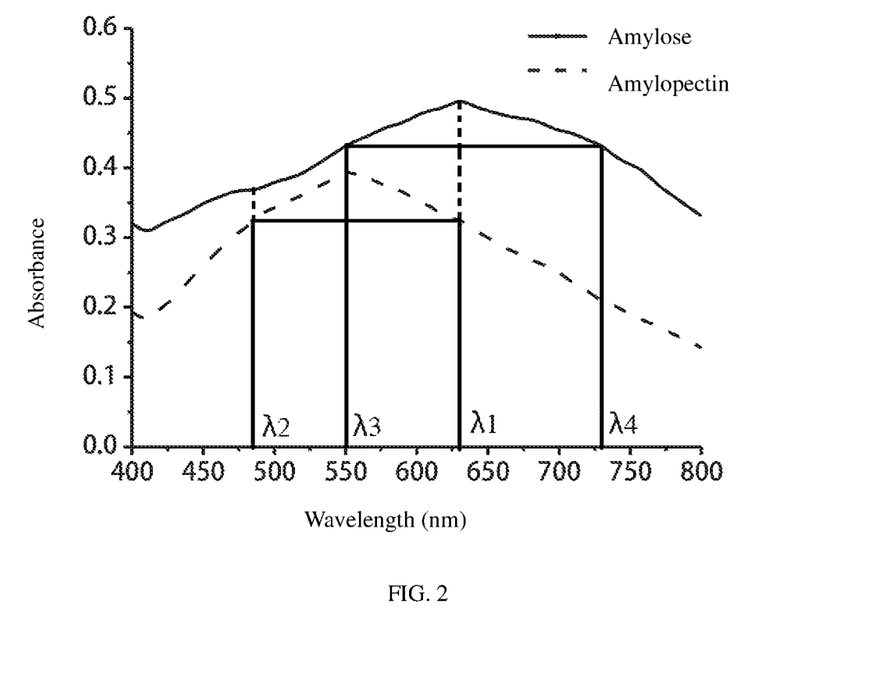
FIG. 2 is an isosbestic plot for the measuring wavelengths and reference wavelengths of amylose and amylopectin.

The measuring wavelength $\lambda1$ and reference wavelength $\lambda2$ of amylose and the measuring wavelength $\lambda3$ and reference wavelength $\lambda4$ of amylopectin are determined according to an isosbestic plot (see FIG. 2). With distilled water as blank, $A\lambda1$ and $A\lambda2$ are measured at $\lambda1$ and $\lambda2$ respectively, and $\Delta_{Aamylose}$ is calculated as: $\Delta_{Aamylose}=A\lambda1-A\lambda2$; and with $\Delta_{Aamylose}$ as y-coordinate and amylose concentration (μg/mL) as x-coordinate, a dual wavelength amylose standard curve is plotted, and a regression equation is obtained for amylose. With distilled water as blank, $A\lambda3$ and $A\lambda4$ are measured at $\lambda3$ and $\lambda4$ respectively, and $\Delta_{Aamylopectin}$ is calculated as: $\Delta_{Aamylopectin}=A\lambda3-A\lambda4$; and with $\Delta_{Aamylopectin}$ as y-coordinate and amylose concentration (μg/mL) as x-coordinate, a dual wavelength amylopectin standard curve is plotted, and a regression equation is obtained for amylopectin.

2) Treatment of Samples and Preparation of Sample Solutions

An air-dried starch sample is ground and screened by a 0.180 mm sieve. The treated sample is dried in a blast drying oven at 105 (±1)° C., and then moisture content of the test raw sample is determined as W1(%). The dried sample is put into the Soxhlet extractor. Diethyl ether is first added, and the resulting mixture is heated to reflux for 3 h of defatting. Then 85% ethanol is added, and the resulting mixture is heated to reflux for 3 h of desugarization. The product is dried in a blast drying oven at 105 (±1)° C., cooled, and weighed to obtain a constant weight. The fat and sugar content W2(%) is determined.

0.1000 g±0.0050 g of defatted and desugared sample is weighed and added to a 50 mL beaker, and a few drops of anhydrous ethanol are added to wet the sample. 10 mL of 0.5 mol/L KOH solution is added, and the sample is dispersed and dissolved for 10 min at 80 (±1)° C. under a water bath. The resulting solution is precisely diluted to 50.00 mL with distilled water and thoroughly mixed. Two sample solutions each of 2.50 mL (i.e., sample solution and sample blank solution) are added to respective volumetric flasks. 20 mL to 30 mL of distilled water is added to each flask, and the pH is adjusted to 3.0 with 0.1 mol/L HCL. 0.5 ml of iodine reagent is added to the sample solution, but no iodine reagent is added to the sample blank solution. The two solutions are precisely diluted to 50.00 mL, thoroughly mixed, stand for 20 min. The sample blank solution is adopted as a colorimetric reference.

3) Determination of Samples and Calculation of Results

With distilled water as blank, the absorbance values are determined with 1 cm cuvettes, and then the amylose concentration $C_{amylose}$ (μg/mL) and amylopectin concentration $C_{amylopectin}$ (μg/mL) in the sample solution are calculated according to the regression equation. The amylose content, amylopectin content and total starch content are calculated according to formula (1), formula (2) and formula (3) respectively:

$$\text{Amylose (\%)} = \frac{C_{amylose} \times 50 \times 50 \times (1 - W_1 - W_2)}{2.5 \times m \times 1000000} \times 100 \quad (1)$$

-continued $$\text{Amylopectin (\%)} = \frac{C_{amylopectin} \times 50 \times 50 \times (1-W_1-W_2)}{2.5 \times m \times 1000000} \times 100 \qquad (2)$$

$$\text{Starch (\%)} = \text{Amylose (\%)} + \text{Amylopectin (\%)} \qquad (3)$$

In the formula, 50 and 50 represent the final volumes of sample solution and test solution (mL) respectively, 2.5 is the volume of sample solution (mL) pipetted for the preparation of a test solution, m is the mass of the defatted and desugared sample (g) weighed for the preparation of a sample solution, W1 is the moisture content of the raw sample (%), and W2 is the fat and sugar content (%).

Degree of substitution (DS) by carboxymethyl in the starch ether prepared in each of examples and comparative examples is determined by the following method.

The fully-washed starch ether sample without Cl⁻ is dried, slowly heated to 700° C. in a muffle furnace, and burned for 1 h to completely ash the sample and quantitatively convert it to Na₂O. The ash is dissolved in a sulfuric acid standard solution for quantification, and then excess sulfuric acid is titrated with a NaOH standard solution. Degree of substitution by carboxymethyl of starch ether is calculated according to formula (4):

$$DS=0.162B/(1-0.08B) \qquad (4)$$

In formula (4), B is the millimolar quantity of ½H₂SO₄ consumed per gram of sample, and it is calculated according to formula (5):

$$B=(C(\tfrac{1}{2}H_2SO_4) \times V(\tfrac{1}{2}H_2SO_4)-C\text{ NaOH} \times V\text{ NaOH})/W \qquad (5)$$

In formula (5),
C(½H₂SO₄): molar concentration of the sulfuric acid used, mol/L;
V(½H₂SO₄): volume of the sulfuric acid used, mL;
C NaOH: molar concentration of the sodium hydroxide solution used, mol/L;
V NaOH: volume of the sodium hydroxide solution used, mL; and
W: mass of the starch ether sample dried to constant weight, g.

The content of methoxy and hydroxyalkoxy in starch ether and cellulose ether prepared in examples and comparative examples is determined according to methods for determining the content of groups in cellulose ether in Appendix D of JC/T2190-2013 "Cellulose Ether for the Dry-Mixed Mortar". Alkoxy and hydroxyalkoxy are quantitatively cleaved by hydroiodic acid under the catalyzation of adipic acid, and then the content of alkoxy and hydroxyalkoxy in starch ether and cellulose ether is determined by gas chromatography.

The viscosity of starch ether prepared in each example is measured in a 5% aqueous solution at 20° C. with an NDJ-1 viscometer, and the viscosity of cellulose ether is measured in a 2% aqueous solution at 20° C. with a B-type RVT viscometer.

Example 1

A preparation method of modified starch ether for improving the anti-sliding property of a ceramic tile adhesive includes the following steps:
Chemical modification: starch was etherified, dried and ground.

Tapioca starch, NaOH, ethanol and Na₂SO₄ were added to a jacketed reactor with a stirrer in sequence. The reactor was evacuated and purged with nitrogen to remove oxygen, and then evacuated once again. Chloroacetic acid, propylene oxide and ethylene oxide were added, and then etherification was conducted at 20° C. for 1.5 h, then at 40° C. for 2.5 h, and then at 60° C. for 4 h. At the end of reaction, ethanol was recovered, and the product was dried and ground.

The tapioca starch, sodium hydroxide, chloroacetic acid, propylene oxide and ethylene oxide were used at a mass ratio of 1:0.09:0.10:0.12:0.02.

The tapioca starch and Na₂SO₄ were used at a mass ratio of 1:0.05.

The tapioca starch and ethanol were used at a mass ratio of 1:0.3.

Figure 3:
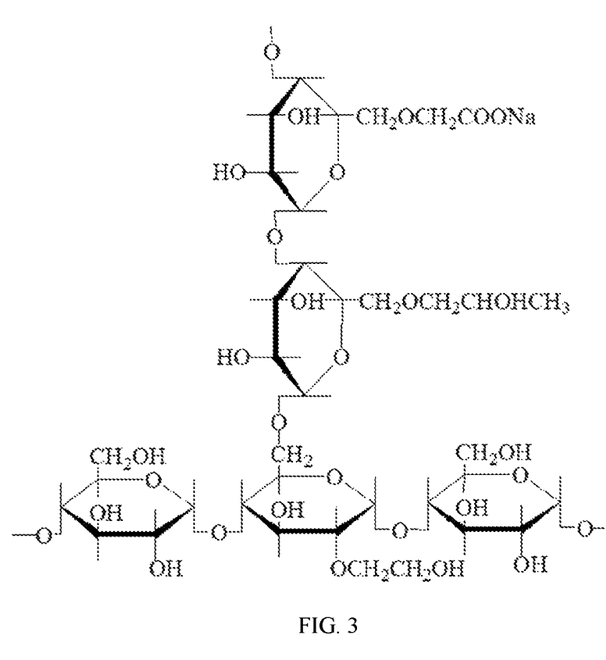
FIG. 3 is a structural diagram of carboxymethyl hydroxypropyl hydroxyethyl starch obtained by chemical modification of the present disclosure.

The tapioca starch includes 17.32% of amylose, 68.73% of amylopectin, and 86.05% of total starch. The prepared carboxymethyl hydroxypropyl hydroxyethyl starch has a structure shown in FIG. 3, a degree of substitution by carboxymethyl of 0.17, and a viscosity of 8,000 cp in a 5% aqueous solution, and includes 12.5% of hydroxypropoxy, 2.5% of hydroxyethoxy, and 16% of ash.

(2) Physical modification: the starch ether obtained in step (1), hydroxypropyl methyl cellulose (methoxy content: 28.0% to 30.0%, hydroxypropoxy content: 7.5% to 12.0%, viscosity measured in a 2% aqueous solution with a B-type RVT viscometer: 60,000 cp, purchased from Shandong Yiteng New Materials Co., Ltd.) and guar gum were mixed.

The carboxymethyl hydroxypropyl hydroxyethyl starch obtained in step (1), thickener and rheological agent were added to a blender for 40 min to 60 min of mixing to obtain modified carboxymethyl hydroxypropyl hydroxyethyl starch.

The carboxymethyl hydroxypropyl hydroxyethyl starch, thickener and rheological agent were used at a mass percentage content of 30%, 65% and 5% respectively.

The modified carboxymethyl hydroxypropyl hydroxyethyl starch prepared by the preparation method of Example 1 was used for the preparation of a ceramic tile adhesive. Components shown in Table 1 were added to a blender and thoroughly mixed, and then 26% of water, based on the total weight of all components, was added. The resulting mixture was mixed with the mixing equipment and mixing method required in JC/T547-2005 "Ceramic Tile Adhesive", and various performance tests were conducted according to the standard. The results are shown in Table 2.

Comparative Example 1

A preparation method of modified starch ether for improving the anti-sliding property of a ceramic tile adhesive includes the following steps:
YT-A03 hydroxypropyl starch (purchased from Shandong Yiteng New Materials Co., Ltd., hydroxypropoxy content: 18.0% to 21.0%, viscosity measured in a 5% aqueous solution: 3,000 cp to 4,000 cp, ash content: ⩽10%) was used without chemical modification.
The ordinary starch ether in step (1), thickener and rheological agent were mixed.
YT-A03 hydroxypropyl starch in step (1), thickener and rheological agent were added to a blender for 40 min to 60 min of mixing to obtain 1# modified hydroxypropyl starch.
YT-A03 hydroxypropyl starch, thickener and rheological agent were used at the same mass percentage content as that in Example 1. The thickener and rheological agent were the same as in Example 1.

The modified starch ether prepared in Comparative Example 1 was used for the preparation of a ceramic tile adhesive. Components shown in Table 1 were added to a blender and thoroughly mixed, and then 26% of water, based on the total weight of all components, was added. The resulting mixture was mixed with the mixing equipment and mixing method required in JC/T547-2005 "Ceramic Tile Adhesive", and various performance tests were conducted according to the standard. The results are shown in Table 2.

TABLE 1

The formulas for ceramic tile adhesives using the products of Example 1 and Comparative Example 1

| Component | Comparative Example 1 | Example 1 |
|---|---|---|
| Cement 42.5 | 400 g | 400 g |
| Fine sand | 450 g | 450 g |
| Heavy calcium carbonate | 121.5 g | 121.5 g |
| Redispersible latex powder | 20 g | 20 g |
| Calcium formate | 3.5 g | 3.5 g |
| Lignocellulose | 1 g | 1 g |
| 1# modified hydroxypropyl starch | 4 g | |
| Modified carboxymethyl hydroxypropyl hydroxyethyl starch | | 4 g |

TABLE 2

Properties for ceramic tile adhesives using the products of Example 1 and Comparative Example 1

| Example | Sliding | Original tensile adhesive strength/MPa | Tensile adhesive strength after soaking in water/MPa | Tensile adhesive strength after thermal aging/MPa | Tensile adhesive strength after a cycle of freezing and thawing/MPa |
|---|---|---|---|---|---|
| Comparative Example 1 | no sliding for 200 g ceramic tile, 3 mm of sliding for 500 g ceramic tile | 1.018 | 0.655 | 0.822 | 0.764 |
| Example 1 | no sliding for 200 g ceramic tile, 0.1 mm of sliding for 500 g ceramic tile | 1.056 | 0.680 | 0.866 | 0.818 |

It can be seen from Table 2 that the modified carboxymethyl hydroxypropyl hydroxyethyl starch prepared in the present disclosure can improve the anti-sagging property of a ceramic tile adhesive, making the anti-sliding property meet the requirement of sliding ≤ 0.5 mm. Moreover, other requirements for the binding property of a ceramic tile adhesive are met. The ceramic tile adhesive of the present disclosure is even superior to the ceramic tile adhesive including 1# modified hydroxypropyl starch in terms of properties, such as the original tensile adhesive strength, the tensile adhesive strength after soaking in water, the tensile adhesive strength after thermal aging and the tensile adhesive strength after a cycle of freezing and thawing in Table 2.

Example 2

A preparation method of modified starch ether for improving the anti-sliding property of a ceramic tile adhesive includes the following steps:
Another starch ether of the present disclosure was prepared according to the description in step (1) of Example 1 except that the etherifying agents were chloroacetic acid and propylene oxide, starch, sodium hydroxide, chloroacetic acid and propylene oxide were used at a mass ratio of 1:0.09:0.10:0.12, and etherification was conducted at 40° C. for 3 h, and then at 60° C. for 5 h.

Figure 4:
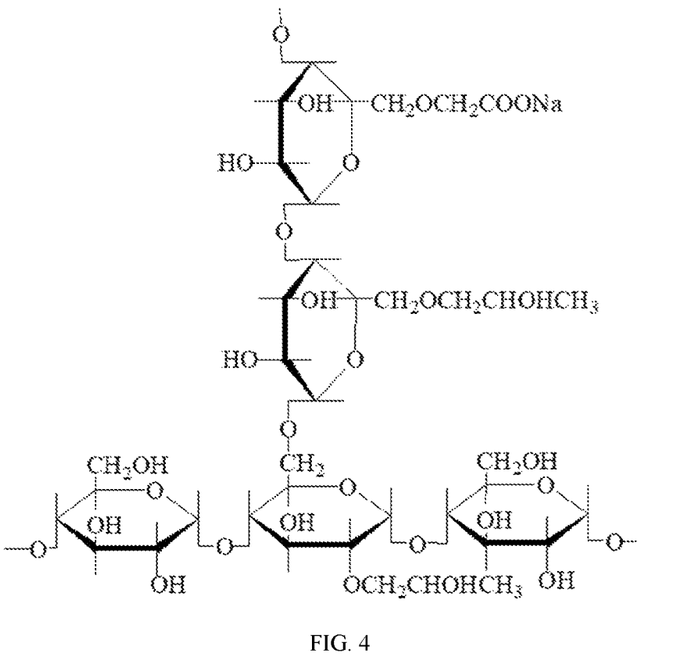
FIG. 4 is a structural diagram of carboxymethyl hydroxypropyl starch obtained by chemical modification of the present disclosure.

The raw starch includes 17.23% of amylose, 68.78% of amylopectin, and 86.01% of total starch. The prepared carboxymethyl hydroxypropyl starch has a structure shown in FIG. 4, a degree of substitution by carboxymethyl of 0.16, and a viscosity of 7,000 cp in a 5% aqueous solution, and includes 12.6% of hydroxypropoxy and 16% of ash.

(2) Physical modification: the starch ether obtained in step (1), thickener and rheological agent were mixed.

The carboxymethyl hydroxypropyl starch obtained in step (1), thickener and rheological agent were added to a blender for 40 min to 60 min of mixing to obtain modified carboxymethyl hydroxypropyl starch.

The carboxymethyl hydroxypropyl starch obtained in step (1) of Example 2, thickener and rheological agent were used at a mass percentage content of 25%, 70% and 5% respectively.

The thickener was hydroxypropyl methyl cellulose (methoxy content: 19.0% to 24.0%, hydroxypropoxy content: 4.0% to 12.0%, viscosity measured in a 2% aqueous solution with a B-type RVT viscometer: 50,000 cp, purchased from Shandong Yiteng New Materials Co., Ltd.); and the rheological agent was xanthan gum.

The modified carboxymethyl hydroxypropyl starch prepared in Example 2 was used for the preparation of a ceramic tile adhesive. Components shown in Table 3 were added to a blender and thoroughly mixed, and then 26% of water, based on the total weight of all components, was added. The resulting mixture was mixed with the mixing equipment and mixing method required in JC/T547-2005 "Ceramic Tile Adhesive", and various performance tests were conducted according to the standard. The results are shown in Table 4.

Comparative Example 2

A preparation method of modified starch ether for improving the anti-sliding property of a ceramic tile adhesive includes the following steps:
YT-B03 hydroxypropyl starch (purchased from Shandong Yiteng New Materials Co., Ltd., hydroxypropoxy content: 11.0% to 14.0%, viscosity measured in a 5% aqueous solution: 3,000 cp to 4,000 cp, ash content: ≤ 10%) was used without chemical modification.
The starch ether in step (1), thickener and rheological agent were mixed.

YT-B03 hydroxypropyl starch, thickener and rheological agent were added to a blender for 40 min to 60 min of mixing to obtain 2# modified hydroxypropyl starch.

YT-B03 hydroxypropyl starch, thickener and rheological agent were used at the same mass percentage content as that in Example 2.

The thickener and rheological agent were the same as in Example 2.

The 2# modified hydroxypropyl starch prepared in Comparative Example 2 was used for the preparation of a ceramic tile adhesive. Components shown in Table 3 were added to a blender and thoroughly mixed, and then 26% of water, based on the total weight of all components, was added. The resulting mixture was mixed with the mixing equipment and mixing method required in JC/T547-2005 "Ceramic Tile Adhesive", and various performance tests were conducted according to the standard. The results are shown in Table 4.

TABLE 3

The formulas for ceramic tile adhesives using the products of Example 2 and Comparative Example 2

| Component | Comparative Example 2 | Example 2 |
|---|---|---|
| Cement 42.5 | 400 g | 400 g |
| Fine sand | 450 g | 450 g |
| Heavy calcium carbonate | 121.5 g | 121.5 g |
| Redispersible latex powder | 20 g | 20 g |
| Calcium formate | 3.5 g | 3.5 g |
| Lignocellulose | 1 g | 1 g |
| 2# modified hydroxypropyl starch | 4 g | |
| Modified carboxymethyl hydroxypropyl starch | | 4 g |

TABLE 4

Properties for ceramic tile adhesives using the products of Example 2 and Comparative Example 2

| Example | Sliding | Original tensile adhesive strength/MPa | Tensile adhesive strength after soaking in water/MPa | Tensile adhesive strength after thermal aging/MPa | Tensile adhesive strength after a cycle of freezing and thawing/MPa |
|---|---|---|---|---|---|
| Comparative Example 2 | 0.3 mm of sliding for 200 g ceramic tile | 0.948 | 0.595 | 0.784 | 0.729 |
| Example 2 | no sliding for 200 g ceramic tile, 0.3 mm of sliding for 500 g ceramic tile | 1.006 | 0.642 | 0.825 | 0.786 |

It can be seen from Table 4 that the modified carboxymethyl hydroxypropyl starch prepared in the present disclosure can improve the anti-sagging property of a ceramic tile adhesive, making the anti-sliding property meet the requirement of sliding ≤ 0.5 mm. Moreover, other requirements for the binding property of a ceramic tile adhesive are met. The ceramic tile adhesive of the present disclosure is even superior to the ceramic tile adhesive including 2# modified hydroxypropyl starch in terms of properties, such as the original tensile adhesive strength, the tensile adhesive strength after soaking in water, the tensile adhesive strength after thermal aging and the tensile adhesive strength after a cycle of freezing and thawing in Table 4.

Example 3

A preparation method of modified starch ether for improving the anti-sliding property of a ceramic tile adhesive includes the following steps:

Another starch ether of the present disclosure was prepared according to the description in step (1) of Example 1 except that the etherifying agents were propylene oxide and ethylene oxide, starch, sodium hydroxide, propylene oxide and ethylene oxide were used at a mass ratio of 1:0.02:0.12:0.05, and etherification was conducted at 20° C. for 2.5 h, at 40° C. for 2.5 h, and at 60° C. for 4 h.

Figure 5:
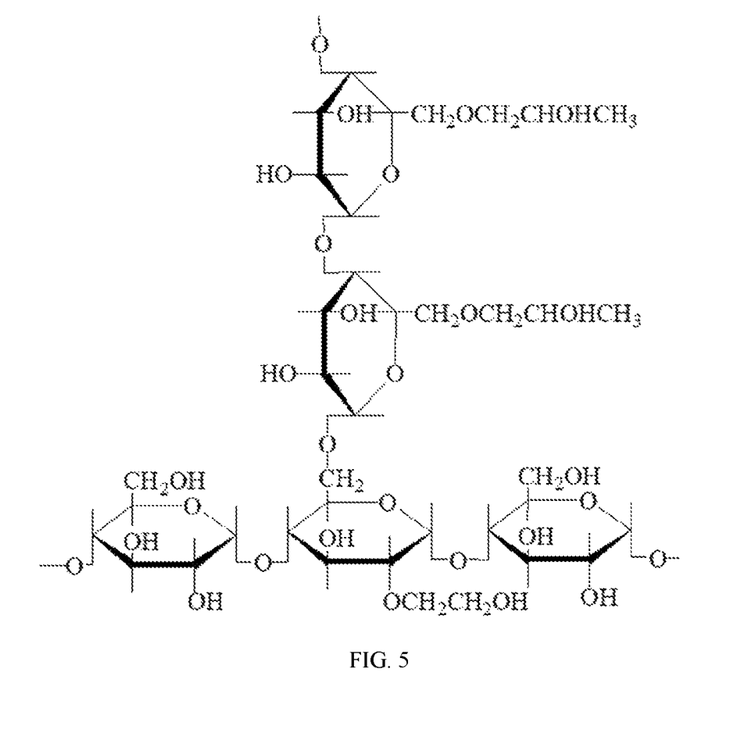
FIG. 5 is a structural diagram of hydroxypropyl hydroxyethyl starch obtained by chemical modification of the present disclosure.

The raw starch includes 17.16% of amylose, 68.73% of amylopectin, and 85.89% of total starch. The prepared hydroxypropyl hydroxyethyl starch is named as 1# hydroxypropyl hydroxyethyl starch. 1# hydroxypropyl hydroxyethyl starch has a structure shown in FIG. 5 and a viscosity of 7,000 cp in a 5% aqueous solution, and includes 12.5% of hydroxypropoxy, 6.5% of hydroxyethoxy, and 8% of ash.

(2) Physical modification: the 1# hydroxypropyl hydroxyethyl starch in step (1), thickener and rheological agent were mixed.

The 1# hydroxypropyl hydroxyethyl starch, thickener and rheological agent were added to a blender for 40 min to 60 min of mixing to obtain 1# modified hydroxypropyl hydroxyethyl starch.

The starch ether, thickener and rheological agent were used at a mass percentage content of 30%, 65% and 5% respectively.

The thickener was hydroxyethyl methyl cellulose (methoxy content: 19.0% to 24.0%, hydroxypropoxy content: 4.0% to 12.0%, viscosity measured in a 2% aqueous solution with a B-type RVT viscometer: 60,000 cp, purchased from Shandong Yiteng New Materials Co., Ltd.); and the rheological agent was carrageenan.

The 1# modified hydroxypropyl hydroxyethyl starch prepared in Example 3 was used for the preparation of a ceramic tile adhesive. Components shown in Table 5 were added to a blender and thoroughly mixed, and then 26% of water, based on the total weight of all components, was added. The resulting mixture was mixed with the mixing equipment and mixing method required in JC/T547-2005 "Ceramic Tile Adhesive", and various performance tests were conducted according to the standard. The results are shown in Table 6.

Comparative Example 3

A preparation method of modified starch ether for improving the anti-sliding property of a ceramic tile adhesive includes the following steps:

YT-A03 hydroxypropyl starch (purchased from Shandong Yiteng New Materials Co., Ltd., hydroxypropoxy content: 18.0% to 21.0%, viscosity measured in a 5% aqueous solution: 3,000 cp to 4,000 cp, ash content: ≤ 10%) was used without chemical modification.

The starch ether in step (1), thickener and rheological agent were mixed.

YT-A03 hydroxypropyl starch, thickener and rheological agent were added to a blender for 40 min to 60 min of mixing to obtain 3# modified hydroxypropyl starch.

YT-A03 hydroxypropyl starch, thickener and rheological agent were used at the same mass percentage content as that in Example 3.

The thickener and rheological agent were the same as in Example 3.

The 3# modified hydroxypropyl starch prepared in Comparative Example 3 was used for the preparation of a ceramic tile adhesive. Components shown in Table 5 were added to a blender and thoroughly mixed, and then 26% of water, based on the total weight of all components, was added. The resulting mixture was mixed with the mixing equipment and mixing method required in JC/T547-2005 "Ceramic Tile Adhesive", and various performance tests were conducted according to the standard. The results are shown in Table 6.

TABLE 5

The formulas for ceramic tile adhesives using the products of Example 3 and Comparative Example 3

| Component | Comparative Example 3 | Example 3 |
| --- | --- | --- |
| Cement 42.5 | 400 g | 400 g |
| Fine sand | 450 g | 450 g |
| Heavy calcium carbonate | 121.5 g | 121.5 g |
| Redispersible latex powder | 20 g | 20 g |
| Calcium formate | 3.5 g | 3.5 g |
| Lignocellulose | 1 g | 1 g |
| 3# modified hydroxypropyl starch | 4 g | |
| 1# modified hydroxypropyl hydroxyethyl starch | | 4 g |

TABLE 6

Properties for ceramic tile adhesives using the products of Example 3 and Comparative Example 3

| Example | Sliding | Original tensile adhesive strength/MPa | Tensile adhesive strength after soaking in water/MPa | Tensile adhesive strength after thermal aging/MPa | Tensile adhesive strength after a cycle of freezing and thawing/MPa |
| --- | --- | --- | --- | --- | --- |
| Comparative Example 3 | 0.4 mm of sliding for 200 g ceramic tile | 1.008 | 0.624 | 0.802 | 0.736 |
| Example 3 | no sliding for 200 g ceramic tile, 0.4 mm of sliding for 500 g ceramic tile | 1.066 | 0.675 | 0.846 | 0.772 |

It can be seen from Table 6 that the 1# modified hydroxypropyl hydroxyethyl starch prepared in the present disclosure can improve the anti-sagging property of a ceramic tile adhesive, making the anti-sliding property meet the requirement of sliding ≤ 0.5 mm. Moreover, other requirements for the binding property of a ceramic tile adhesive are met. The ceramic tile adhesive of the present disclosure is even superior to the ceramic tile adhesive including 3# modified hydroxypropyl starch in terms of properties, such as the original tensile adhesive strength, the tensile adhesive strength after soaking in water, the tensile adhesive strength after thermal aging and the tensile adhesive strength after a cycle of freezing and thawing in Table 6.

Example 4

A preparation method of modified starch ether for improving the anti-sliding property of a ceramic tile adhesive includes the following steps:

1. Another starch ether of the present disclosure was prepared according to the description in step (1) of Example 1 except that the etherifying agents were propylene oxide and ethylene oxide, starch, sodium hydroxide, propylene oxide and ethylene oxide were used at a mass ratio of 1:0.02:0.18:0.02, and etherification was conducted at 20° C. for 2 h, at 40° C. for 3 h, and at 60° C. for 5 h.

The raw starch includes 17.19% of amylose, 68.78% of amylopectin, and 85.97% of total starch. The prepared hydroxypropyl hydroxyethyl starch is named as 2# hydroxypropyl hydroxyethyl starch. 2# hydroxypropyl hydroxyethyl starch has a structure shown in FIG. 5 and a viscosity of 3,500 cp in a 5% aqueous solution, and includes 16.5% of hydroxypropoxy, 2.5% of hydroxyethoxy, and 8% of ash.

(2) Physical modification: the starch ether obtained in step (1), thickener and rheological agent were mixed.

The 2# hydroxypropyl hydroxyethyl starch, thickener and rheological agent were added to a blender for 40 min to 60 min of mixing to obtain 2# modified hydroxypropyl hydroxyethyl starch.

The 2# hydroxypropyl hydroxyethyl starch, thickener and rheological agent were used at a mass percentage content of 20%, 75% and 5% respectively.

The thickener was hydroxyethyl methyl cellulose (methoxy content: 19.0% to 24.0%, hydroxypropoxy content: 4.0% to 12.0%, viscosity measured in a 2% aqueous solution with a B-type RVT viscometer: 40,000 cp, purchased from Shandong Yiteng New Materials Co., Ltd.); and the rheological agent was guar gum.

The 2# modified hydroxypropyl hydroxyethyl starch prepared in Example 4 was used for the preparation of a ceramic tile adhesive. Components shown in Table 7 were added to a blender and thoroughly mixed, and then 26% of water, based on the total weight of all components, was added. The resulting mixture was mixed with the mixing equipment and mixing method required in JC/T547-2005 "Ceramic Tile Adhesive", and various performance tests were conducted according to the standard. The results are shown in Table 8.

b. Comparative Example 4

A preparation method of modified starch ether for improving the anti-sliding property of a ceramic tile adhesive includes the following steps:

YT-B03 hydroxypropyl starch (purchased from Shandong Yiteng New Materials Co., Ltd., hydroxypropoxy content: 11.0% to 14.0%, viscosity measured in a 5% aqueous solution: 3,000 cp to 4,000 cp, ash content: ⩽ 10%) was used without chemical modification.

The starch ether in step (1), thickener and rheological agent were mixed.

YT-B03 hydroxypropyl starch, thickener and rheological agent were added to a blender for 40 min to 60 min of mixing to obtain 4# modified hydroxypropyl starch.

YT-B03 hydroxypropyl starch, thickener and rheological agent were used at the same mass percentage content as that in Example 4.

The starch ether was the hydroxypropyl starch described in step (1) of Comparative Example 4. The thickener and rheological agent were the same as in Example 4.

The 4# modified hydroxypropyl starch prepared in Comparative Example 4 was used for the preparation of a ceramic tile adhesive. Components shown in Table 7 were added to a blender and thoroughly mixed, and then 26% of water, based on the total weight of all components, was added. The resulting mixture was mixed with the mixing equipment and mixing method required in JC/T547-2005 "Ceramic Tile Adhesive", and various performance tests were conducted according to the standard. The results are shown in Table 8.

TABLE 7

The formulas for ceramic tile adhesives using the products of Example 4 and Comparative Example 4

| Component | Comparative Example 4 | Example 4 |
|---|---|---|
| Cement 42.5 | 400 g | 400 g |
| Fine sand | 450 g | 450 g |
| Heavy calcium carbonate | 121.5 g | 121.5 g |
| Redispersible latex powder | 20 g | 20 g |
| Calcium formate | 3.5 g | 3.5 g |
| Lignocellulose | 1 g | 1 g |
| 4# modified hydroxypropyl starch | 4 g | |
| 2# modified hydroxypropyl hydroxyethyl starch | | 4 g |

TABLE 8

Properties for ceramic tile adhesives using the products of Example 4 and Comparative Example 4

| Example | Sliding | Original tensile adhesive strength/MPa | Tensile adhesive strength after soaking in water/MPa | Tensile adhesive strength after thermal aging/MPa | Tensile adhesive strength after a cycle of freezing and thawing/MPa |
|---|---|---|---|---|---|
| Comparative Example 4 | 0.35 mm of sliding for 200 g ceramic tile | 0.977 | 0.615 | 0.803 | 0.746 |
| Example 4 | no sliding for 200 g ceramic tile, 0.35 mm of sliding for 500 g ceramic tile | 1.048 | 0.649 | 0.834 | 0.761 |

It can be seen from Table 8 that the 2# modified hydroxypropyl hydroxyethyl starch prepared in the present disclosure can improve the anti-sagging property of a ceramic tile adhesive, making the anti-sliding property meet the requirement of sliding ⩽ 0.5 mm. Moreover, other requirements for the binding property of a ceramic tile adhesive are met. The ceramic tile adhesive of the present disclosure is even superior to the ceramic tile adhesive including 4# modified hydroxypropyl starch in terms of properties, such as the original tensile adhesive strength, the tensile adhesive strength after soaking in water, the tensile adhesive strength after thermal aging and the tensile adhesive strength after a cycle of freezing and thawing in Table 8.

The above exemplary implementations should not be considered as limiting the protection or scope of the present disclosure. It should be appreciated by those skilled in the art that many alternative improvements or changes can be made to the implementations of the present disclosure while still falling within the protection and scope of the present disclosure.

Anything that is not detailed in the present disclosure is a well-known technique of those skilled in the art.

What is claimed is:

1. A preparation method of modified starch ether for improving the anti-sliding property of a ceramic tile adhesive, comprising chemical modification of subjecting starch to one-step etherification to obtain starch ether, followed by physical modification;

wherein, the chemical modification of one-step etherification comprises:

mixing tapioca starch, an alkalizer, an alcohol and an inhibitor to form a mixture, into which an etherifying agent is added; and subjecting the mixture to etherification, which is initially conducted at a lowered temperature of 10 to 20° C. for 1.5 to 2.5 hours, and then conducted in stages at different raised temperatures, comprising a stage at 40° C. for a period of 2.5 to 3 hours and a further stage at 60° for a period of 4 to 5 hours;

wherein, the tapioca starch, the alkalizer and the etherifying agent are used in the onestep etherification at a mass ratio of 1:(0.01-1):(0.02-1.2);

wherein, the etherifying agent is a mixture of propylene oxide and ethylene oxide, or a mixture of chloroacetic acid, propylene oxide, and ethylene oxide;

and wherein, the tapioca starch and the alcohol are used in the one-step etherification at a mass ratio of 1:(0.1-0.3);

and wherein, the physical modification is conducted by mixing the starch ether with an thickener and a rheological agent for 40 min to 60 min; wherein, the thickener is hydroxypropyl methyl cellulose and/or hydroxyethyl methyl cellulose, the rheological agent is one or more of guar gum, carrageenan and xanthan gum, and the starch ether, the thickener and the rheological agent, in percentage by weight, are 20% to 30%, 64% to 76%, and 4% to 6%, respectively.

2. The preparation method of modified starch ether for improving the anti-sliding property of a ceramic tile adhesive according to claim 1, wherein the alkalizer is alkali metal hydroxide powder; the alcohol is one or more of methanol, ethanol, isopropanol, n-butanol, tertbutanol, and diethylene glycol; and the inhibitor is an alkali metal salt.

3. The preparation method of modified starch ether for improving the anti-sliding property of a ceramic tile adhesive according to claim 1, wherein the alkalizer is NaOH and/or KOH; the alcohol is ethanol and/or isopropanol; and the inhibitor is $Na_2SO_4$ and/or NaCl.

4. The preparation method of modified starch ether for improving the anti-sliding property of a ceramic tile adhesive according to claim 1, wherein the alkalizer is NaOH; the alcohol is ethanol; and the inhibitor is $Na_2SO_4$.

5. The preparation method of modified starch ether for improving the anti-sliding property of a ceramic tile adhesive according to claim 1, wherein the tapioca starch and the inhibitor are used in the one-step etherification at a mass ratio of 1:(0.05-0.1).

6. A modified starch ether for improving the anti-sliding property of a ceramic tile adhesive formed by:
chemical modification of subjecting starch to one-step etherification to obtain starch ether, followed by physical modification, wherein, the chemical modification of one-step etherification comprises:
mixing tapioca starch, an alkalizer, an alcohol and an inhibitor to form a mixture, into which an etherifying agent is added; and
subjecting the mixture to etherification, which is initially conducted at a lowered temperature of 10 to 20° C. for 1.5 to 2.5 hours, and then conducted in stages at different raised temperatures, comprising a stage at 40° C. for a period of 2.5 to 3 hours and a further stage at 60° for a period of 4 to 5 hours;
wherein, the tapioca starch, the alkalizer and the etherifying agent are used in the one step etherification at a mass ratio of 1:(0.01-1):(0.02-1.2);
wherein, the etherifying agent is a mixture of propylene oxide and ethylene oxide, or a mixture of chloroacetic acid, propylene oxide, and ethylene oxide;
and wherein, the tapioca starch and the alcohol are used in the one-step etherification at a mass ratio of 1:(0.1-0.3); and wherein,
the physical modification is conducted by mixing the starch ether with an thickener and a rheological agent for 40 min to 60 min; wherein, the thickener is hydroxypropyl methyl cellulose and/or hydroxyethyl methyl cellulose, the rheological agent is one or more of guar gum, carrageenan and xanthan gum, and the starch ether, the thickener and the rheological agent, in percentage by weight, are 20% to 30%, 64% to 76%, and 4% to 6%, respectively.

7. The modified starch ether of claim 6, wherein the alkalizer is alkali metal hydroxide powder; the alcohol is one or more of methanol, ethanol, isopropanol, n-butanol, tert-butanol, and diethylene glycol; and the inhibitor is an alkali metal salt.

8. The modified starch ether of claim 6, wherein the alkalizer is NaOH and/or KOH; the alcohol is ethanol and/or isopropanol; and the inhibitor is $Na_2SO_4$ and/or NaCl.

9. The modified starch ether of claim 6, wherein the alkalizer is NaOH; the alcohol is ethanol; and the inhibitor is $Na_2SO_4$.

10. The modified starch ether of claim 6, wherein the tapioca starch and the inhibitor are used in the one-step etherification at a mass ratio of 1:(0.05-0.1).

\* \* \* \* \*